April 11, 1967 O. E. STURMAN 3,313,567
BELLEVILLE SPRING BIASED BUMPER
Filed Feb. 23, 1965 2 Sheets-Sheet 1
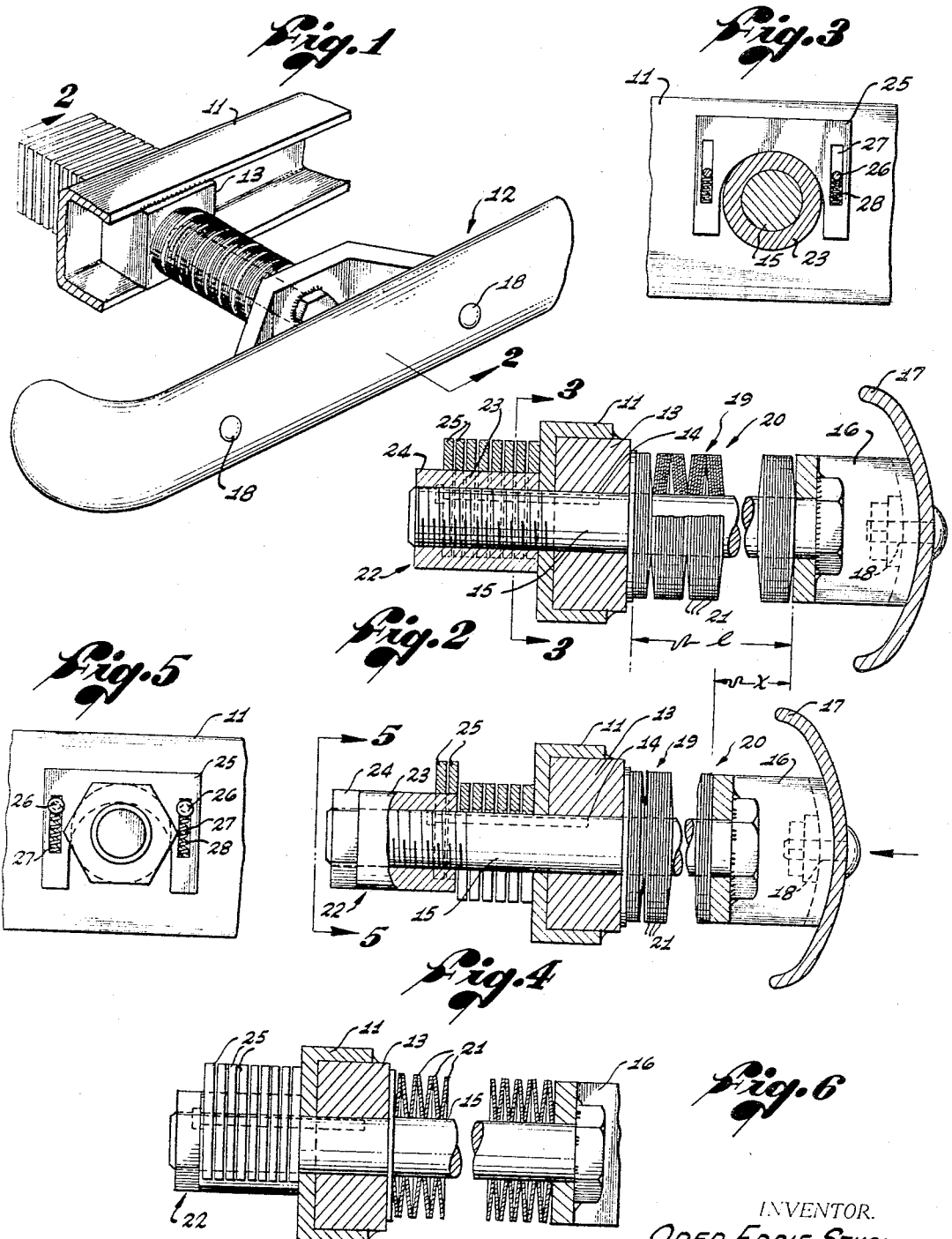
INVENTOR.
ODED EDDIE STURMAN
BY Fulwider, Patton, Rieber
Lee, and Utecht
ATTORNEYS

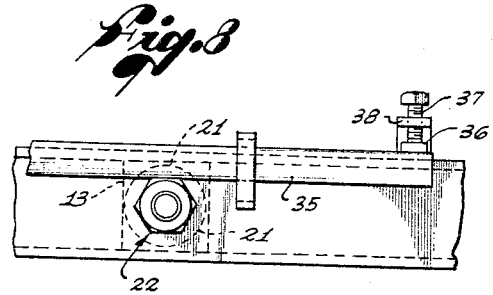
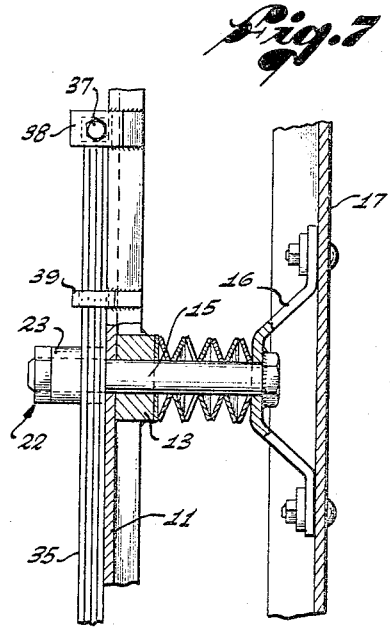
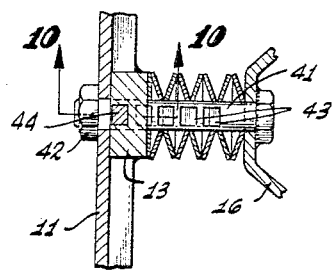
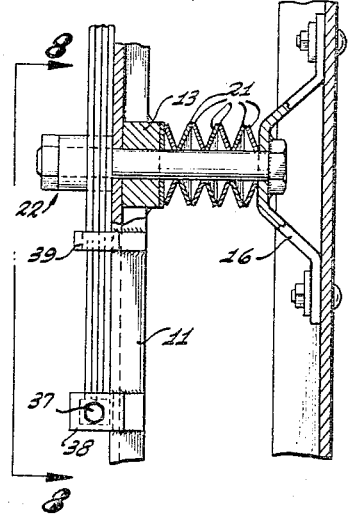
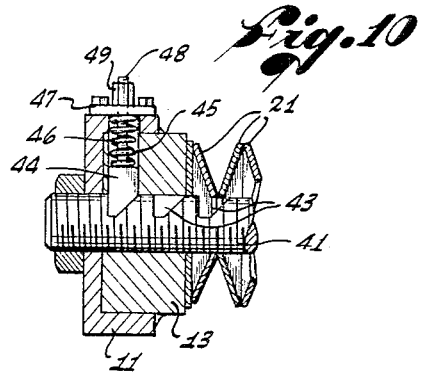

United States Patent Office 3,313,567
Patented Apr. 11, 1967

3,313,567
BELLEVILLE SPRING BIASED BUMPER
Oded Eddie Sturman, 9854 O'Melveny,
Arletta, Calif. 91331
Filed Feb. 23, 1965, Ser. No. 434,565
16 Claims. (Cl. 293—89)

The present invention relates to a safety bumper device for vehicles which will absorb a major portion of the energy associated with vehicle collisions.

The invention is particularly adapted for use with motor vehicles and includes elastic members which absorb the impact energy from collisions, dissipating a portion of this energy and storing another portion against rebound. This lessens the effect of impact on the vehicle, and more particularly on its passengers, whereby to add to the safety of driving and to reduce the deaths, injuries and damages resulting from motor vehicle collisions.

Desirably, a large portion of the energy of impact is dissipated by friction between the elastic members into heat, and the portion of non-dissipated energy which is absorbed is stored in the stressed elastic members against rebound until it is voluntarily released by the operator. The safety bumper device of this invention is simple, inexpensive, very compact, and operates automatically upon the occurrence of a collision to dissipate and absorb a major portion of the energy of impact.

To minimize the space required by the safety bumper device of this invention and render it of compact construction, the elastic members are desirably in the form of dished washers, such as Belleville springs, to give a short range of motion with attendant high stresses, and to absorb large forces in a small space. Preferably, these spring washers are nested together and their flexing is accompanied by large frictional resistance between the contacting surfaces of adjacent washers so that a large portion of the energy of impact is dissipated through friction into heat and need not be stored. In general, the more of the impact energy which is dissipated, rather than stored, the more desirable the bumper construction and the more compact it can be made.

To prevent rebound of the spring washers, automatic holding means are provided which operate to retain the bumper device in the rearmost position relative to the frame of the vehicle to which it is moved by the impact, with the spring washers maintained under substantially the maximum stress to which they are subjected by the collision. In this way the stored energy is prevented from moving the bumper plate back to its original position which might cause additional damage. The retaining means may be released thereafter by the operator when he so chooses, the return of the bumper and the elastic spring washers to their original positions being accomplished slowly without shock.

It is therefore an object of the present invention to provide an improved safety bumper device for vehicles.

Another object of this invention is the provision of an improved energy dissipating and absorbing bumper device for motor vehicles which will lessen the effect of impact upon the vehicle and the passengers therein in the event of a collision.

Another object of this invention is the provision of an improved bumper safety device for motor vehicles which is simple and inexpensive and relatively light and compact.

A further object of this invention is the provision of an improved bumper safety device for motor vehicles in which a substantial amount of the energy of impact in a collision is directly dissipated and in which another portion of the energy is stored and held against rebound.

A still further object of this invention is the provision of an improved bumper safety device for motor vehicles in which a maximum amount of the energy of impact in a collision is dissipated and absorbed in a minimum of space.

These and other objects and features of the invention will be apparent to those skilled in the art from the following specification and the appended drawings, in which:

FIGURE 1 is a perspective view, with parts broken away, of the mounting of a safety bumper device according to the present invention;

FIGURE 2 is a vertical sectional view on the line 2—2 of FIGURE 1;

FIGURE 3 is a transverse vertical sectional view on the line 3—3 of FIGURE 2;

FIGURE 4 is a view similar to FIGURE 2, but showing the position of the parts under the force of a collision;

FIGURE 5 is a rear elevational view from the plane 5—5 of FIGURE 4;

FIGURE 6 is a partial view similar to FIGURE 4, but utilizing a different spring washer arrangement;

FIGURE 7 is a horizontal sectional view through a modified form of safety bumper device according to the present invention;

FIGURE 8 is a partial rear elevational view from the plane 8—8 of FIGURE 7;

FIGURE 9 is a partial horizontal sectional view of a further modified form of the invention; and FIGURE 10 is an enlarged detail sectional view on the line 10—10 of FIGURE 9.

Referring to the embodiment of the invention illustrated in FIGURES 1 through 5, the front channel 11 of the frame of a motor vehicle has a safety bumper device 12 according to the present invention mounted thereon to receive the impact of a collision. A pair of guide blocks 13 are rigidly mounted within the channel 11 adjacent opposite sides of the vehicle, as shown more particularly in the modification of FIGURE 7. Through the blocks 13 and the channel 11 extend guide holes 14 in which are slidably mounted elongated bolts 15 upon whose forward ends are rigidly secured brackets 16, as by welding. A front plate 17 for the safety bumper device may take any form and is here shown much like a conventional, stationary bumper. The bumper front plate 17 is mounted on the brackets 16, as by bolts 18.

On the bolts 15, between the front faces of the guide blocks 13 and the rear faces of the brackets 16, are mounted a plurality of groups 19 and 20 of Belleville type spring washers 21. The groups 19, as shown in FIGURE 2, are concave forwardly, whereas the groups 20 are convex forwardly, and the groups 19 and 20 alternate so that the outer edges engage at one side and the inner edges at the opposite side of each group. In each group 19, 20 are a plurality of nested spring washers of any desired number, for example, 6–12, so that there is relatively large interengaging surface area contact between the individual spring washers whereby upon flexing of the washers, large frictional forces will be exerted to dissipate a large portion of the energy of impact to give what may be considered similar to a mechanical hysteresis effect.

At the back of the vehicle frame channel 11 a nut 22 is threaded on the end of each bolt 15. The nuts 22 desirably have forward cylindrical portions 23 and rear hexagonal portions 24 to be engaged by a wrench or like tool. About the cylindrical portions 23 are normally disposed U-shaped retaining members 25. These retaining members 25 normally rest on top of the cylindrical portions 23 of the nuts 22, as shown in FIGURE 2. The members 25 are guided for vertical movement by pins 26 extending through slots 27 in the opposite legs of the members 25 and the retaining members are biased downwardly, as shown in the figures, by means of springs 28 retained within the slots 27. As the front plate 17 moves backwardly relative to the vehicle frame under impact, the bolts 15 and nuts 22 will move back therewith and will permit the retaining members 25 to successively move downwardly in front of the nuts 22 into engagement with the bolts 15, as shown in FIGURE 4. The bolts 15 and the front plate 17 are thereby retained in the maximum rearward position relative to the vehicle frame to which they are driven by the impact force of a collision, thus maintaining the spring washers 21 under stress and preventing rebound of the front bumper plate.

In stressing and flexing of the spring washers 21 as the front bumper plate 17 moves toward the vehicle frame channel 11, large frictional forces are encountered in effecting relative movement between the engaged surface areas of the individual nested spring washers of each of the groups 19 and 20. In overcoming these frictional forces as the spring washers are stressed toward a flatter position, a large portion of the energy of impact is dissipated in the form of heat. This dissipated energy need not be stored, and it is therefore desirable to have this dissipated energy relatively large so that the amount of energy which must be stored in the stressed spring washers is lessened and therefore the number of spring washers and the space required to accommodate them is minimized. On the other hand, the washers and their nested groups should not be so inelastic as to form, in effect, a solid bumper which would defeat the purpose of the invention. This will be determined by the weight of the vehicle, the size and thickness of the spring washers, and the material thereof, and other considerations which are clearly within the knowledge of the individual mechanical designer.

As previously described, as the front bumper plate 17 moves rearwardly relative to the vehicle frame to stress the spring washers 21, the bolts 15 and the nuts 22 also move rearwardly with the nuts 22 separating from the frame channel 11. As the nuts 22 pass beyond each retaining member 25, that retaining member moves downwardly under the bias of the springs 28 to a position between the frame channel 11 and its associated nut 22, as shown in FIGURE 4. These downwardly moved retaining members prevent the nuts 22 from returning toward the frame channel 11 and therefore hold the front bumper plate at its maximum position of movement toward the frame of the vehicle. This prevents rebound of the front bumper plate and maintains the spring washers 21 in their stressed position, as shown in FIGURE 4, until the operator rotates the nuts 22 backwardly on the bolts 15, thereby permitting the stress in the spring washers 21 to be slowly relieved without damage or shock. When this stress has been so relieved, the retaining members 25 may then be easily lifted into their upper inactive positions of FIGURES 2 and 3, whereupon the nuts 22 may be again rotated forwardly on the bolts 15 into their normal positions, as in FIGURE 2, and the safety bumper device will be positioned to automatically function in the event of another collision.

The device of FIGURE 6 is the same as that previously described, except that the spring members 21 are not nested into groups 19 and 20 so that the dissipation of the large portion of the energy of impact through friction is not present and the major portion of the impact energy is absorbed in the flexing of the spring washers 21, this absorbed energy being retained against rebound in the same manner as previously described. In some applications the absorption of energy only in the stressed washers of FIGURE 6 may be desired, without the dissipation of energy through friction to produce a mechanical hysteresis effect, as in the preferred embodiment of FIGURES 1 through 5.

The modification of FIGURES 7 and 8 shows a different arrangement for the retaining members by which energy is stored in the stressed elastic members against rebound. Here like parts have been given the same reference numerals as in the embodiment of FIGURES 1 through 5. Instead of retaining members 25 which in the previously described embodiment are U-shaped and individual to each of the bolts 15, there are provided elongated metallic straps 35 which extend over the cylindrical portions 23 of the nuts 22 and are stressed by having their opposite ends moved downwardly by engagement therewith of pressure plates 36 mounted on the ends of adjustable studs 37 threadedly mounted in brackets 38 rigidly secured to the vehicle frame channel 11. The retaining straps 35 are loosely held and guided by means of stationary brackets 39. The spring washers 21 of the modification of FIGURES 7 and 8 are shown in the form of FIGURE 6 for simplicity in the drawing, but it is obvious that they may equally as well be placed in the energy-dissipating, nested-group form of the embodiment of FIGURES 1–5.

The operation of the modification of FIGURES 7 and 8 is substantially the same as previously described, the retaining straps 35 successively moving downwardly in front of the nuts 22 as the nuts move rearwardly with the front bumper plate 17 under impact forces. This again retains the spring washers 21 under stress and prevents rebound. Each retainer strap 35 thereby functions for both the bolts 15 in the same manner as the individual retaining members 25 and it is readily apparent that the ends of the retaining straps 35 are independently movable to retain each of the bolts 15 in its maximum rearward position relative to the vehicle frame. The release of the stress of the spring washers 21 is the same as previously described, by loosening the nuts 22 until the stress is relieved, raising the retaining straps 35, and then retightening the nuts 22 into their original positions with the cylindrical portions 23 beneath the retaining straps 35.

In the modification of FIGURES 9 and 10, a still further retaining means for the safety bumper device is illustrated. Here the bolts 15 are replaced by bolts 41 on which the brackets 16 are rigidly secured and which extend slidably through the openings in the guide blocks 13 and channel 11. The ends of the bolts 41 are secured by simple retaining nuts 42 which may be of the locktight type. The spring washers 21 in this form may be individual, as in FIGURE 6, or nested as in the embodiment of FIGURES 1–5, and they surround the bolts 41 between the front faces of the guide blocks 13 and the rear faces of the brackets 16 in the same manner. The upper surfaces of the bolts 41 are provided with a plurality of notches 43 adapted to successively receive a locking plunger 44 as the bolt 41 moves rearwardly relative to the vehicle frame under impact.

The latching plungers 44 are slidably mounted within an opening 45 in the top of the guide block and are biased into latching position by means of a spring 46 bearing at one end against the latching plunger 44 and at its other end against a removable plate 47 secured on channel 11. The operation of the modification of FIGURES 9 and 10 is the same as previously described in that the energy stored by stressing the spring washers 21 is held against rebound by latching the bolts 41 in the maximum rearward position to which they are driven by impact. The latching plungers 44 and notches 43 perform the functions of the retaining members 25 and retaining straps 25 in preventing rebound movement of the bolts 41 after impact.

Release of bolts 41 may be effected in any desired manner. As shown in FIGURE 10, the latching plunger 44 is provided with an integral threaded stem 48 of reduced diameter which extends upwardly through the spring 46 and an opening in the plate 47 to receive a nut 49. By rotating nut 49 the latching plunger 44 can be withdrawn from the notch 43 into which it was projected and the bolt 41 will thereby be released to move forwardly to relieve the stress in the spring washers 21. To prevent violent forward movement of the bolts and bumper front plate on release, the nut 42 may be moved forwardly to the channel 11 before the latching plunger 44 is withdrawn. Backing off of the nut 42 thereafter will slowly release the stress in the spring washers 21.

While the invention has been illustrated and described with the use of Belleville type spring washers 21, it will be understood that in its broadest force-absorbing and retaining aspects other elastic members may be substituted for the spring washers 21. However, the Belleville type spring washers are preferred because of the large amount of energy that can be both dissipated and stored with a relatively short range of motion and attendant high stresses. By this arrangement the device can be made quite compact while dissipating and storing a large amount of energy.

While certain preferred embodiments of the invention have been specifically illustrated and described, it will be understood further that the invention is not limited thereto, as many variations will be apparent to those skilled in the art and the invention is to be given its broadest interpretation within the terms of the following claims.

I claim:

1. A safety bumper device for motor vehicles comprising: a vehicle frame; means supporting a pair of bolts for sliding movement relative to the frame; means supporting a bumper plate in front of said frame on said bolts; and a plurality of Belleville spring washers mounted on said bolts between the frame and the bumper plate and adapted to be stressed upon movement of the bumper plate toward the frame under the impact of a collision, said spring washers being arranged in groups in which a plurality of adjacent washers are facing in a same direction in nested relationship, the washers in one group facing in a direction opposite to those washers in the next adjacent group, the spring washers in each group having large surface area contact within the group to exert large frictional resistance against flexing of the spring washers whereby a considerable portion of the energy of impact will be dissipated without storing as the spring washers flex against the frictional resistance.

2. A safety bumper device for vehicles comprising: a bumper plate mounted on the vehicle in position to receive the impact of a collision, means mounting said bumper plate so that it is movable relative to the vehicle under an impact force; means biasing said bumper plate away from the vehicle so that the energy of impact is absorbed in said biasing means as the bumper plate moves toward the vehicle in a collision, said biasing means being in the form of stacked spring washers flexing to absorb a large amount of energy within a relatively small range of movement; said stacked spring washers being arranged in groups in which adjacent washers face in a same direction providing relatively large surface area contact within the groups, said washers in one group facing in a direction opposite to those washers in the next adjacent group, flexing of the spring washers occuring against substantial frictional resistance to effect dissipation of a considerable amount of the energy of impact without storing.

3. A safety bumper device for vehicles comprising: a bumper plate mounted on the vehicle in position to receive the impact of a collision, means mounting said bumper plate so that it is movable relative to the vehicle under an impact force; means biasing said bumper plate away from the vehicle so that the energy of impact is absorbed in said biasing means as the bumper plate moves toward the vehicle in a collision, said biasing means being in the form of stacked spring washers flexing to absorb a large amount of energy within a relatively small range of movement, said spring washers being arranged in nested groups in which adjacent washers are facing in the same direction providing relatively large surface area contact within the groups and with adjacent groups of washers facing in opposite directions to dispose the end convex surface of each group immediately adjacent the end convex surface of the next group and the end concave surface of each group facing the end concave surface of the immediately adjacent group, flexing of the spring washers occuring against substantial frictional resistance within the groups to effect dissipation of a considerable amount of the energy of impact without storing.

4. A safety bumper device for motor vehicles comprising: a vehicle frame; a bumper plate; means supporting said bumper plate in front of said frame so that it is movable rearwardly of the vehicle under an impact force; a plurality of Belleville spring washers mounted in stacked relation to oppose rearward movement of said bumper plate and adapted to be stressed upon movement of the bumper plate rearwardly under the impact of a collision, said Belleville spring washers being arranged in nested groups in which adjacent washers face in a same direction to provide large surface area contact within the group to exert large frictional resistance against flexing of the spring washers to dissipate a considerable portion of the energy of impact without storing as the spring washers flex against the frictional resistance as the bumper plate moves rearwardly under an impact force, said washers in one group facing in a direction opposite to the washers in the next adjacent group.

5. A safety bumper device for motor vehicles comprising: a vehicle frame; a bumper plate; means supporting said bumper plate in front of said frame so that it is movable rearwardly of the vehicle under an impact force; a plurality of Belleville spring washers mounted in stacked relation to oppose rearward movement of said bumper plate and adapted to be stressed upon movement of the bumper plate rearwardly under the impact of a collision, said Belleville spring washers being arranged in nested groups in which adjacent washers face in a same direction to provide large surface area contact within the group to exert large frictional resistance against flexing of the spring washers to dissipate a considerable portion of the energy of impact without storing as the spring washers flex against the frictional resistance as the bumper plate moves rearwardly under an impact force, the Belleville spring washers in each group all facing in the same direction and adjacent groups in the stack of Belleville spring washers facing in opposite directions to present the end convex surface of each group to the end convex surface of the adjacent group and to present the end concave surface of each group to the end concave surface of the adjacent group.

6. A safety bumper device for vehicles comprising: a bumper plate mounted on the vehicle in position to receive the impact of a collision; means mounting said bumper plate so that it is movable relative to the vehicle under an impact force; means biasing said bumper plate away from the vehicle so that the energy of impact is absorbed in said biasing means as the bumper plate moves toward the vehicle in a collision; and means automatically progressively operable over substantially the major part of the range of movement of said bumper plate for retaining the bumper plate in the position closest to the vehicle into which it is driven under an impact force regardless of the point in said range of movement at which said closest position occurs whereby to store the absorbed energy in the biasing means against rebound of the bumper plate.

7. The safety bumper device defined in claim 6 in which the mounting means for the bumper plate includes members slidable relative to the frame and carrying outward facing abutment surfaces thereon and said retaining means includes a plurality of retaining members biased toward said sliding members and successively movable in front of said abutment surfaces as the sliding members and surfaces are moved inwardly with the bumper plate under impact whereby to retain the front plate and the sliding members at the maximum position to which they are driven by the impact forces.

8. The safety bumper device defined in claim 7 in which each abutment surface is the forward face of a nut threaded on a slidable member so that after a collision the nut may be backed off of the member to relieve the stress on the biasing means and permit return of the retaining members to their inactive positions, whereafter the nut may be moved forwardly into its normal position beneath the retaining members.

9. The safety bumper device defined in claim 6 in which the retaining means is a latching plunger engaging succesively in axially spaced notches in a member movable with the bumper plate to hold the plate in the position closest to the vehicle frame to which it is driven by the impact force.

10. The safety bumper device defined in claim 7 in which said retaining members are elongated straps extending across a plurality of said slidable members and biased downwardly to move independently and progressively into retaining engagement with the sliding members as the members move rearwardly.

11. A safety bumper device for vehicles comprising: a bumper plate mounted on the vehicle in position to receive the impact of a collision; means mounting said bumper plate so that it is movable relative to the vehicle under an impact force; means biasing said bumper plate away from the vehicle so that the energy of impact is absorbed in said biasing means as the bumper plate moves toward the vehicle in a collision; and means automatically progressively operable over substantially the major part of the range of movement of said bumper plate for retaining the bumper plate in the position closest to the vehicle into which it is driven under an impact force regardless of the point in said range of movement at which said closest position occurs whereby to store the absorbed energy in the biasing means against rebound of the bumper plate, said retaining means being releasable at will to slowly release the stress on the biasing means by permitting return outward movement of the bumper.

12. A safety bumper device for vehicles comprising: a bumper plate mounted on the vehicle in position to receive the impact of a collision; means mounting said bumper plate so that it is movable relative to the vehicle under an impact force; means biasing said bumper plate away from the vehicle so that the energy of impact is absorbed in said biasing means as the bumper plate moves toward the vehicle in a collision; and means automatically progressively operable over substantially the major part of the range of movement of said bumper plate for retaining the bumper plate in the position closest to the vehicle into which it is driven under an impact force regardless of the point in said range of movement at which said closest position occurs whereby to store the absorbed energy in the biasing means against rebound of the bumper plate, said biasing means being in the form of stacked spring washers flexing to absorb a large amount of energy within a relatively small range of movement.

13. A safety bumper device for vehicles comprising: a bumper plate mounted on the vehicle in position to receive the impact of a collision; means mounting said bumper plate so that it is movable relative to the vehicle under an impact force; means biasing said bumper plate away from the vehicle so that the energy of impact is absorbed in said biasing means as the bumper plate moves toward the vehicle in a collision; and means automatically operable for retaining the bumper plate in the position closest to the vehicle into which it is driven under an impact force regardless of the point in the range of movement of said bumper plate at which said closest position occurs whereby to store the absorbed energy in the biasing means against rebound of the bumper plate, said biasing means being in the form of stacked spring washers flexing to absorb a large amount of energy within a relatively small range of movement, said stacked spring washers being arranged in nested groups providing relatively large surface area contact within the groups whereby flexing of the spring washers occurs against substantial frictional resistance to effect dissipation of a considerable amount of the energy of impact without storing.

14. A safety bumper device for motor vehicles comprising: a vehicle frame; means supporting a pair of bolts for sliding movement relative to the frame; means supporting a bumper plate in front of said frame on said bolts; a plurality of Belleville spring washers mounted on said bolts between the frame and the bumper plate and adapted to be stressed upon movement of the bumper plate toward the frame under the impact of a collision, said spring washers being arranged in nested groups having large surface area contact within the group to exert large frictional resistance against flexing of the spring washers whereby a considerable portion of the energy of impact will be dissipated without storing as the spring washers flex against the frictional resistance; and means for holding the bumper plate in the position closest to the frame that it is driven under the impact force regardless of the point in the range of movement of said bumper plate at which said closest position occurs to maintain the spring washers stressed against rebound of the bumper plate.

15. A safety bumper device for motor vehicles comprising: a vehicle frame; means supporting a pair of bolts for sliding movement relative to the frame; means supporting a bumper plate in front of said frame on said bolts; a plurality of Belleville spring washers mounted on said bolts between the frame and the bumper plate and adapted to be stressed upon movement of the bumper plate toward the frame under the impact of a collision; nuts on said bolts in back of said frame; and a plurality of side-by-side retaining members engaging said nuts and biased towards said bolts whereby upon movement of the bolts and nuts rearwardly by impact on the front plate, the retaining members will successively move in front of the nuts to prevent rebound movement of the bolts and front bumper plate.

16. A safety bumper device for motor vehicles comprising: a vehicle frame; means supporting a pair of bolts for sliding movement relative to the frame; means supporting a bumper plate in front of said frame on said bolts; a plurality of Belleville spring washers mounted on said bolts between the frame and the bumper plate and adapted to be stressed upon movement of the bumper plate toward the frame under the impact of a collision, said spring washers being arranged in nested groups having large surface area contact within the group to exert large frictional resistance against flexing of the spring washers whereby a considerable portion of the energy of impact will be dissipated without storing as the spring washers flex against the frictional resistance; nuts on said bolts in back of said frame; and a plurality of side-by-side retaining members engaging said nuts and biased towards said bolts whereby upon movement of the bolts and nuts rearwardly by impact on the front plate, the retaining members will successively move in front of the nuts to prevent rebound movement of the bolts and front bumper plate regardless of the point in the range of movement of the bumper plate at which rearward movement ceases.

References Cited by the Examiner

UNITED STATES PATENTS

| 1,184,683 | 5/1916 | Christenson | 188—196 |
| 1,471,568 | 10/1923 | Olsen | 293—86 |
| 2,432,717 | 12/1947 | Berger | 267—1 |
| 2,553,237 | 5/1951 | Camarero | 267—1 |
| 2,997,325 | 8/1961 | Peterson | 293—86 X |

FOREIGN PATENTS 596,535   4/1925   France.

ARTHUR L. LA POINT, *Primary Examiner.*

EUGENE G. BOTZ, *Examiner.*

H. BELTRAN, *Assistant Examiner.*